United States Patent Office 3,553,012
Patented Jan. 5, 1971

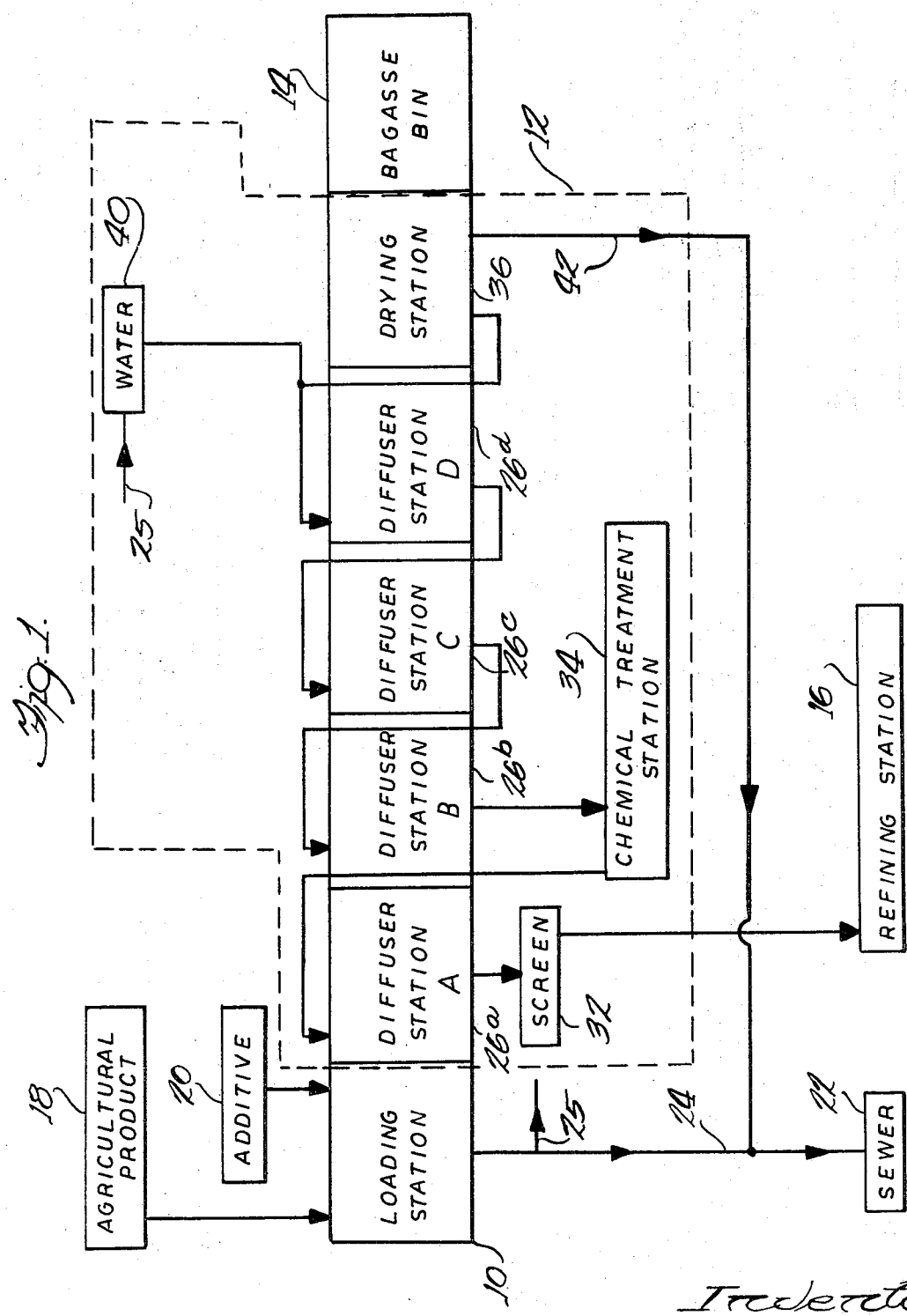

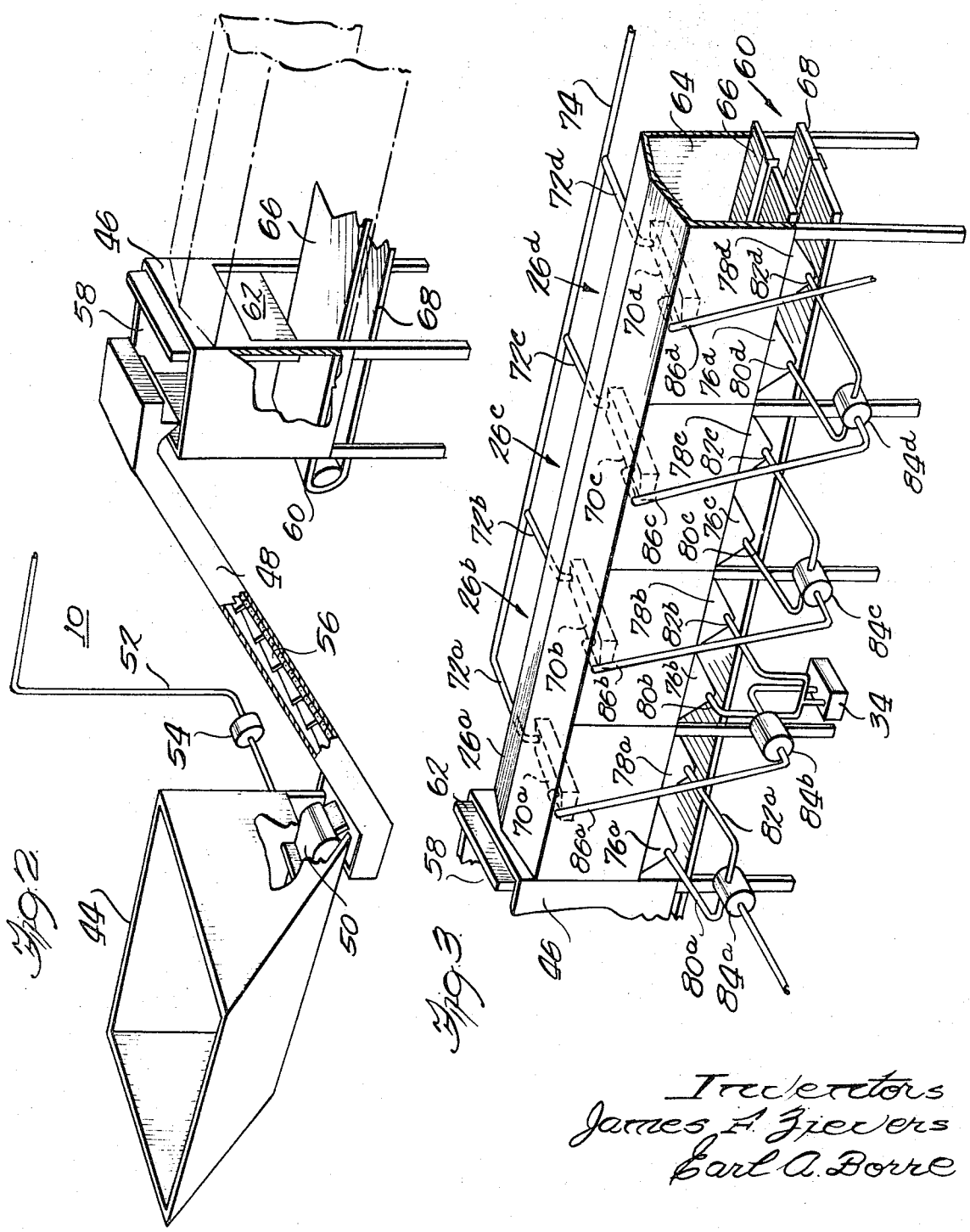

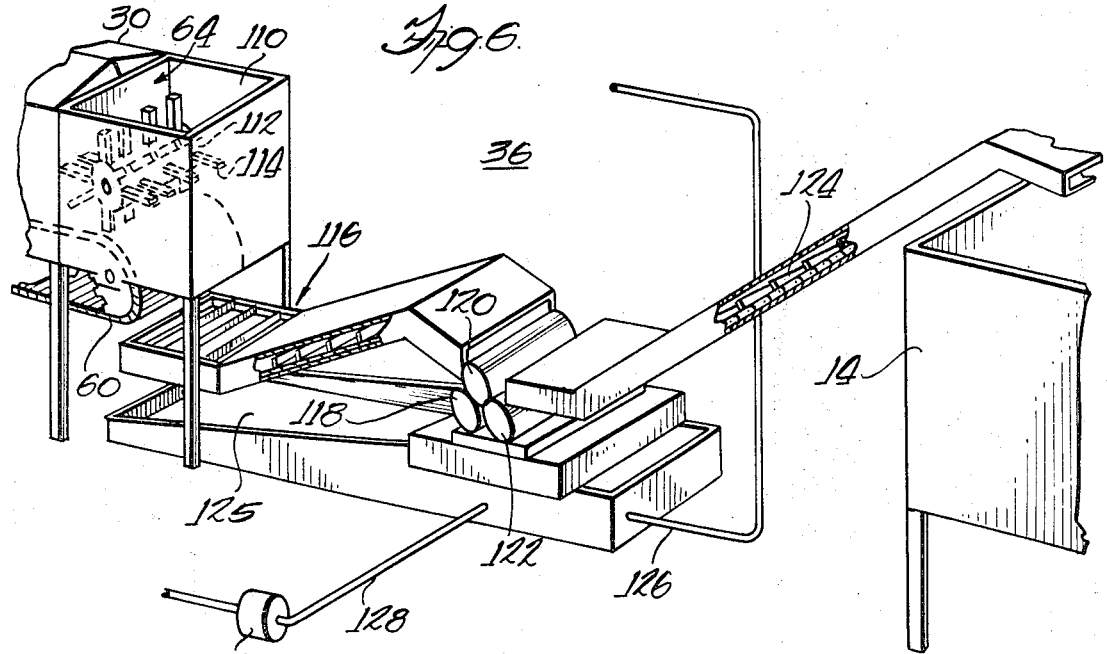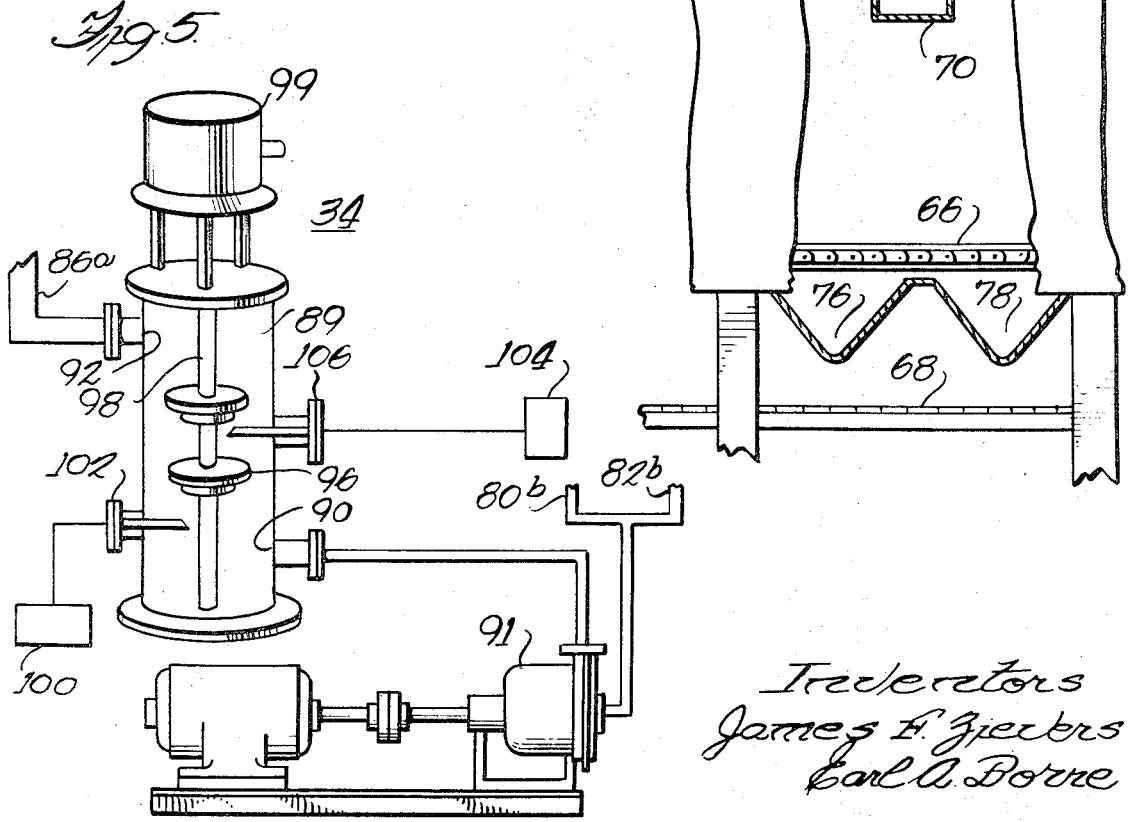

3,553,012
METHOD AND APPARATUS FOR PROCESSING AGRICULTURAL PRODUCTS
James F. Zievers, La Grange, and Earl A. Borre, Itasca, Ill., assignors to Industrial Filter & Pump Mfg. Co., Cicero, Ill., a corporation of Illinois
Filed Apr. 3, 1968, Ser. No. 718,609
Int. Cl. C13d 1/04, 1/12
U.S. Cl. 127—5          18 Claims

ABSTRACT OF THE DISCLOSURE

A sugar bearing agricultural product is fed to a conveyor system in controllable amounts from a hopper and transported thereon through six diffuser stations, a drying station and finally into a bagasse bin. Liquid at between 120° F. and 140° F. is pumped from a trough in the bottom of each station to a weir at the top of the previous station from which it pours onto the agricultural product to remove sugar. This liquid is purified by a defecation operation after passing through the agricultural product in the second station and then is passed through the agricultural product in the first station to remove fines formed by the defecation operation.

---

This invention relates to a method and apparatus for processing agricultural products, and more particularly relates to a method and apparatus for separating the ingredients of an agricultural product such as for the separating of sugar from sugar bearing agricultural products.

One technique for separating the ingredients of an agricultural product is to dissolve some of the ingredients in a liquid and separate the liquid from the solid residue of the agricultural product. For example, sugar bearing agricultural products are cut open and hot water is poured onto them. The hot water dissolves the sugar. The water bearing the sugar in solution is separated from the remaining solid agricultural product and the sugar is recrystallized from it. The solid remainder of the agricultural product may be used for fodder or to make paper or plasterboard or the like.

In some prior art processing systems for separating the ingredients of agricultural products by dissolving one ingredient and removing it in solution, the agricultural products are processed by the batch. For example, sugar beets are sliced and placed in diffusion cells where hot water is poured over them to dissolve and separate the sugar. The batch method is unsatisfactory in some respects. One of its disadvantages is that it is slow. The rate at which some agricultural products are processed may be increased by processing them at higher temperatures, but this often causes undesirable impurities to be dissolved and included in the liquid that is removed from the solid agricultural product.

Continuous processes have also been used to remove a soluble ingredient from an agricultural product. These processes are capable of processing agricultural products at a higher rate but the prior art processes have other disadvantages. When a large amount of impurities are to be removed from the liquid, the filtering costs are high. The costs are high because large amounts of liquids are used to wash out the ingredients over the transport path. The concentration of the valuable ingredient in the liquid is often low even though there is a large volume of impurities in it. This problem becomes even more serious when the liquid is defecated because the defecation causes fines to be carried by the liquid, which fines are difficult to remove.

Accordingly, it is an object of this invention to provide an improved method and apparatus for the processing of agricultural products.

It is a further object of this invention to provide a continuous process for removing ingredients as a liquid from a solid agricultural product.

It is a still further object of this invention to provide a method and apparatus for separating the ingredients from an agricultural product, which method and apparatus is capable of handling larger amounts of the agricultural product than could be previously economically processed.

It is a still further object of this invention to provide a method and apparatus for removing a liquid from a solid agricultural product and at the same time removing a high percentage of the impurities from the liquid.

It is a still further object of this invention to provide a method and apparatus for removing sugar juices from an agricultural product by dissolving them in a liquid. The liquid will have a high concentration of sugar and a minimum amount of starches, gums, waxes and solid impurities.

In accordance with the above and further objects of the invention, the agricultural product is conveyed into a loading station which permits a controlled volume to be carried by a chain conveyor from the loading station to a processing section. In the processing section, the chain conveyor carries the agricultural product through six diffuser stations and finally deposits it in a drying station. In the drying station, it is swept onto another conveyor that carries it through rolls which squeeze the remaining liquid from it and move it onto still another conveyor. The final conveyor carries the dried agricultral product over the top of a bagasse bin and deposits it therein.

Each of the diffuser stations includes a weir at the top and a liquid collecting trough at the bottom. Heated water is supplied to the agricultural product at the last station and liquid is pumped from the liquid collecting trough at the bottom of each of the diffuser stations except the first one and deposited in the weir of the previous station, which weir causes it to be poured over the agricultural product as it is carried along the conveyor. The liquid from the collecting trough of the second station is defecated before being applied to the weir of the first station. The fines that remain in the liquid are filtered out of the liquid by the agricultural product in the first station. The liquid is collected in the trough of the first station and is sent to the refining station from there after screening. The liquid is maintained at a temperature between 120° Fahrenheit and 140° Fahrenheit during the processing, at which temperatures the starches, gums and waxes are not dissolved but sugar is dissolved.

The invention and the above noted and further features thereof will be more fully understood from the following detailed description when considered in connection with the accompanying drawings, in which:

FIG. 1 is a block diagram illustrating an embodiment of the invention;

FIG. 2 is a simplified perspective drawing, partially broken away, illustrating the loading station of an embodiment of the invention;

FIG. 3 is a fragmentary, simplified, perspective drawing of the diffuser stations of an embodiment of the invention;

FIG. 4 is a fragmentary elevational view, partially broken away, illustrating a portion of a diffuser station;

FIG. 5 is a simplified schematic view of the chemical treatment station of an embodiment of the invention; and FIG. 6 is a simplified perspective view, partially broken away, of the drying station and bagasse bin of an embodiment of the invention.

GENERAL FEATURES

In FIG. 1 a block diagram of an embodiment of the invention is shown having a loading station 10, a processing section 12 shown within the broken lines, a bagasse bin 14 and a refining station 16. A solid agricultural product is transported in controlled quantities from the loading station 10 through the processing section 12 which separates a liquid from the solid agricultural product, and after treating the liquid, supplies it to the refining station 16. The rest of the agricultural product is conveyed to the bagasse bin 14 and stored therein.

The agricultural product 18 is first deposited in the loading station 10. In the preferred embodiment, the agricultural product 18 is a sugar-bearing agricultural product such as raw corn, cane sugar, or root of ti plant (*Cordyline terminalis*). The agricultural product is normally chopped or sliced before processing and, because of this, will be referred to as mulch or silage hereinafter.

An additive 20 may be added to the loading station along with the agricultural product for initial treatment thereof. The additive may be, for example, lime in a sufficient quantity to bring the pH of the agricultural product to between 7 and 7.5. When the pH of the agricultural product is between 7 and 7.5, it is neutral and does not cause excessive corrosion of the apparatus.

The mulch may contain excessive moisture when it is deposited into the loading station. This surplus moisture from the loading station is drained into a sewerage system 22 through a conduit 24 or is pumped to the supply of inlet water 40 through a conduit 25.

The processing section 12 receives the mulch from the loading station 10 and separates the sugar from the mulch. For this purpose, it includes six diffuser stations, four of which 26a, 26b, 26c, and 26d are shown in FIG. 1 for the purposes of illustration. The processing section also includes a drying station which receives the agricultural product from the last diffuser station 26d, dries it and supplies it to the bagasse bin 14.

The first diffuser station, Diffuser Station A, receives the mulch from a loading station 10 and permits the liquid from the agricultural product to flow through a screen 32 into the refining station 16. The next diffuser station, Diffuser Station B, receives the mulch from the first diffuser station and permits liquid from the agricultural product to flow into a chemical treatment station 34 where it is defecated to remove impurities and to raise its pH to between 7 and 7.5. The liquid is then applied to the mulch in station A and flows through the mulch after the mulch is conveyed from the load station. After passing through the mulch in Station A, it flows through the dewatering screen 32 and into the refining station 16. The next diffuser station, Diffuser Station C, receives the agricultural product from Diffuser Station B and permits the liquid from the product to flow back to Diffuser Station B and to be applied over the agricultural product. Similarly, the next diffuser station, Diffuser Station D, receives the agricultural product from Diffuser Station C and pumps liquid therefrom back to Diffuser Station C. Hot water is poured over the mulch at station D.

In summary, the agricultural product in the form of mulch is conveyed in sequence through Diffuser Stations A, B, C, and D in that order. Hot water is poured over it and is drained from it at each station, being taken from the mulch at one station and applied to the mulch at the preceding station so as to circulate in the opposite direction from which the mulch is traveling.

After leaving the last diffuser station, Diffuser Station D, the mulch is transported to a drying station 36 which extracts further liquid and supplies the liquid back to Diffuser Station D. The drying station 36 also includes rollers that squeeze out any liquid that remains and a conveyor that delivers the dried agricultural product to the bagasse bin 14.

The agricultural product in the bagasse bin 14 may be used as fodder or to make paper or plasterboard after the sugar has been removed from it. The sugar that is dissolved by the hot water is filtered through a relatively thick layer of the mulch in each of the diffuser stations as it circulates back in a direction opposite to the direction of motion of the mulch.

The circulation of the liquid through the mulch increases its concentration of sugar. Moreover, the repeated passages through the mulch aids in filtering out solid impurities.

Because the mulch is between 6 and 12 feet in thickness, most solid impurities are removed from the liquid as it flows through the mulch. However, additional filter and chemical treatment stations may be inserted between the diffuser stations if desired. For example, the liquid may be passed through screens between each diffuser station. Where this is done, screens of smaller gages are included between the stations near the beginning of the processing section than between the stations near the end so that the liquid passes through finer and finer gage screens as it proceeds to the beginning of the process at station A.

LOADING STATION

In FIG. 2 a simplified perspective view, partially broken away, of the loading station 10 is shown having a loading bin 44, a feed hopper 46, and an elevator section 48, interconnecting the loading bin 44 and the feed hopper 46. The raw mulch is deposited in the loading bin 44 and carried from the loading bin 44 to the feed hopper 46 on the elevator 48. The feed hopper 46 permits a controlled amount of the mulch to pass into the processing section.

The loading bin 44 includes a belt 50 at its lowermost portion, which belt conveys the mulch from the bin 44 to the elevator 48. Before the mulch is conveyed from the bin, it may receive an additive. For this purpose, a conduit 52 is connected to the loading bin 44 through a valve 54. An additive such as dissolved lime may be applied through the conduit 52 to the mulch while the mulch is on the conveyor 50. Besides receiving an additive, excess liquids are drained from the mulch while it is in the loading bin 44. Liquids from the mulch are drained from the bottom of the bin 44 through a conduit 24 and either permitted to flow into the sewerage system 22 (FIG. 1) or else recirculated back to one of the further diffuser stations, such as diffuser station D, through another conduit (not shown) where it may be applied on top of the mulch for circulation to the preceding diffuser stations A-C.

The elevator 48 includes an inclined conveyor 56 for carrying the mulch upward from the conveyor 50 to the open top 58 of the feed hopper 46 and for depositing it in the feed hopper through its open top. The feed hopper 46 includes a horizontal conveyor 60 at its bottom which conveyor extends through an adjustable sliding door 62 in one wall to a location in the drying station 36 (FIGS. 1 and 6) at the end of the processing section 12 (FIG. 1). The conveyor 60 is a chain type conveyor and pulls the mulch along the length of the processing section 12 while permitting liquid to drain through the conveyor to the bottom of the diffuser stations 26. The sliding door 62 is adjustable in height and controls the amount of mulch that is transported by the conveyor 60. It is normally adjusted to a height of between 6 and 8 feet above the top of the conveyor 60.

DIFFUSER STATIONS

The diffuser stations are best illustrated by the fragmentary elevational view, partially broken away of the diffuser station 26c in FIG. 4 and the perspective view of the four diffuser stations 26a–26d in FIG. 3. In FIG. 3 a simplified perspective view of the four diffuser stations 26a–26d is shown, having the entrance of the first diffuser station, Diffuser Station A, abutting the feed hopper 46 to receive mulch through the opening provided by the upwardly opened door 62 and having the exit end 64 of the last diffuser station, Diffuser Station D, through which the mulch passes through the drying station (FIG. 6). The mulch is transported on the upper portion 66 of the chain conveyor 60 shown in FIGS. 3 and 4, which conveyor also has a lower portion 68 forming a continuous endless belt. As the mulch is transported along the conveyor 60, it is treated to remove the sugar in a liquid solution.

Each of the four diffuser stations 26A–26d, shown illustratively in FIGS. 3 and 4, include beneath their roof a corresponding one of the four weirs 70A, 70b, 70c, and 70d, respectievly. A liquid is supplied to these weirs through the conduit 74 and the branch conduits 72a–72d each of which connects a corresponding one of the weirs 70a–70d to the conduit 74. Water and additives are applied to weirs 70a–70d from the conduit 74 and the branch conduits 72a–72d. From the weirs 70a–70d the liquid is poured over the much on the conveyor 66.

At the bottom of each of the diffuser stations 26a–26d is a corresponding pair of liquid collecting troughs 76a–76d and 78a–78d. These troughs collect the liquid after it has passed through the mulch on the conveyor 60, which liquid includes the dissolved sugar. A corresponding one of the conduits 80a–80d communicates with each of the liquid collecting troughs 76a–76d and a corresponding one of the conduits 82a–82d communicates with each of the liquid troughs 78a–78d. Further, a corresponding one of the pumps 84a–84d is associated with each of the four diffuser stations 26a–26d except that the pump 84b may be omitted from the diffuser station 26b if the chemical treatment station supplies the pumping force.

As the mulch is conveyed from the feed hopper 46 to the exit 64 of the group of communicating diffuser stations 26a–26d, the liquid circulates through the mulch in the opposite direction moving from each of the diffuser stations to the preceding station. For this purpose, the conduit 86d receives the liquid from the drying station (FIGS. 1 and 6) which liquid is pumped to the weir 70d from which it is poured over the mulch and collects in the troughs 76d and 78d of the diffuser station 26d. The liquid is drawn through the conduits 80d and 82d and pumped by the pump 84d through the conduit 86c to the weir 70c of the preceding station where it pours over the mulch in that station. In turn, the liquid is collected by the troughs 76c and 78c at the bottom of diffuser station 26c. From these troughs it is drawn through the conduits 80c and 82c and pumped through the conduit 86b to the weir 70b by the pump 84c where it is poured on the mulch in diffuser station 26b.

The liquid is collected in the liquid collection troughs 76b and 78b at the bottom of diffuser station 26b and drawn through the conduits 80b and 82b into the chemical treatment station 34 where it is defecated. The pump 84b then draws the defecated liquid from the tank of the chemical treatment station 34 and applies it to the weir 70a through the conduit 86a and it is poured over the mulch in the first dispersion station 26a. The pump 84b may be omitted if the chemical treatment station 34 provides its own pumping in a manner to be described hereinafter.

The liquid collected in the liquid collection troughs 76a and 78a from the first station is drawn through the conduits 80a and 82a by the pump 84a and applied through the dewatering screen 32 (FIG. 1) to the refining station 16 (FIG. 1). The screen 32 removes solid impurities that have been precipitated by the chemical treatment station 34.

The circulation of liquid through the dispersion station in a direction against the direction of motion of the mulch increases the concentration of sugar in the liquid before it is sent to the refining station. Moreover, the liquid is filtered each time it passes through the thick layer of mulch to remove solid impurities. Because of the filtering and conservation of liquid, large quantities of the agricultural product may be passed through the processing section and the sugar will be effectively removed from it.

CHEMICAL TREATMENT STATION

In FIG. 5 a simplified schematic view of a chemical treatment station is shown. This unit serves both as a chemical processing station and a pump to apply liquid through the conduit 86a to the weir 70a (FIG. 3). This type of chemical treatment station is known in the trade as an In-Line Finalizer and is sold commercially by Industrial Filter & Pump Mfg. Co., 5900 Ogden Ave., Cicero, Ill.

The liquid is drawn through the pipes 80b and 82b into the tank 89 of the chemical treatment station 34 through the orifice 90 and, after being defecated, flows upwardly and out of the orifice 92 and into the conduit 86a leading to the weir 70a of the first diffuser station 26a. The flow of the liquid is compelled by a pump 91 which may be included in the chemical treatment station, but a separate pump 84b may be used instead.

The In-Line Finalizer includes the two impellers 94 and 96 positioned one under the other on the shaft 98 and driven by the motor 99 in a direction that forces liquid downwardly against the main stream between the orifice 90 and the orifice 92 to create two vortices. Calcium hydroxide $Ca(OH)_2$ is applied from the container 100 into the bottom vortex formed by the impeller 96 through an adjustable nozzle 102. The calcium hydroxide is mixed with the liquid and causes impurities to be precipitated. As the liquid flows upward into the upper vortex formed by the impeller 94, phosphoric acid ($H_3PO_4$) is introduced into the vortex from the container 104 through the adjustable nozzle 106. The phosphoric acid neutralizes the solution to provide a neutral filtered solution which is pumped through the conduit 86a.

The above-described process is known as defecation and causes precipitation of the calcium and magnesium ashes from the liquid. It also raises the pH of the liquid to a value between 6½ and 7½ at which pH the solution is neutral and non-corrosive. As this liquid flows from the weir 70a over the mulch on the conveyor in the station 26a, the fines that remain in the solution as a result of the defecation are filtered out by the mulch so that the liquid pumped by the pump 84a through the screen 32 (FIG. 1) is pure and free of the fines.

DRYING STATION

In FIG. 6 a simplified perspective view, partially broken away, of the drying station 36 is shown having an entrance to the rake compartment 110 abutting the exit 64 of the last diffuser station 26d. Within the rake compartment 110 a brush rake 112 is rotatably mounted and has its radially extending prongs 114 aligned with the conveyors 60 and 116 so that they sweep past the conveyor 60 and force the mulch thereon onto the drag conveyor 116. The drag conveyor 116 pulls the mulch to the bite of the two squeeze and drying rolls 118 and 120. Abutting the two squeeze and dry rolls a bagasse roll 122 aids in forcing the squeezed and dried mulch onto the elevator conveyor 124 which raises the mulch and deposits it into the bagasse bin 14.

Liquid squeezed from the mulch in the drying station is collected by the liquid sump 125 that extends under the rake compartment 110 and the rolls 118, 120 and 122 and is recirculated to the diffuser stations through a conduit 126 or is pumped to the sewer system through a conduit 128 by means of the pump 130.

SUMMARY OF THE PREFERRED EMBODIMENT

As is best shown in FIG. 1, the mulch, which may be chopped raw corn, is applied to a loading station 10 and mixed therein with lime to neutralize it and render it non-corrosive. The loading station 10 is best shown in FIG. 2 and includes a loading bin 44 for initially receiving the mulch through an open end and for moving the mulch on a conveyor near its bottom onto the elevator conveyor 56 which raises the mulch and drops it into the feed hopper 46.

At the bottom of the feed hopper 46 is a conveyor 60 which extends from the loading station through the processing section 12 and into the entrance of the drying station. A moveable door 62 is adjusted in height over the conveyor to control the height of the mulch as it passes through the mulch processing section.

The mulch processing section includes the diffuser stations 26, the drying station 36, and the chemical treatment station 34. The mulch is conveyed through the diffuser stations where it is sprayed by hot liquid from weirs at the top of the station. The liquid is collected at the bottom underneath the diffuser stations and pumped to the preceding station so that the liquid flows in a direction opposite to the direction of the mulch.

After passing through the mulch in the second station from the beginning of the diffuser stations, the liquid is applied to a chemical treatment station 34 which defecates it. The remaining small fines in this liquid are removed in the first station when the liquid is passed through the mulch for the last time before being removed from the processing section. This liquid is then passed through a dewatering screen 32 which filters out further impurities and is pumped to a refining station for use.

The processing section 12 operates at a temperature which permits the solvation of sugar but not of starches, gums and waxes so that the liquid sent to the refining station is a lightly colored sugar solution. The mulch is sent through a drying station best shown in FIG. 6 where the remaining liquid is removed from it. After leaving the drying station it is placed in a bagasse bin 14. It may be used as fodder or to make paper or plasterboard.

The agriculture product processing method and apparatus disclosed herein is capable of handling large quantities of agricultural products on a continuous basis. The circulation of the liquid in a direction against the motion of the mulch permits this liquid to have a relative high concentration of the dissolved material that is to be removed. Moreover, it is well filtered from passing through the thick mulch several times. This filtering action is especially significant in the last stage where the mulch removes the fines that remain in the solution after defecation.

It is difficult to remove these fines by ordinary filtering methods for a large quantity of liquid. The long continuous path over which the agricultural product is processed enables the processing to be done at a low temperature without excessively extending the time for processing. By using a lower temperature, a better sugar solution can be obtained. If higher temperatures were to be used, the starches, waxes and gums would be dissolved with the sugar and this would yield a lower quality sugar solution.

Although an embodiment of the invention has been disclosed with some particularity, many modifications and variations in the invention can be made in the light of the above teachings. It is therefore to be understood that, within the scope of the appended claims, the invention may be practiced otherwise than as specifically described.

What is claimed is:

1. A method of extracting juice from an agricultural product comprising the steps of:
    continuously feeding said agricultural product along a predetermined path divided into stations;
    draining fluid from one of said stations in said path and applying said fluid to the agricultural product at an intermediate station located between the beginning of said path and said one station;
    draining fluid that has passed through said agricultural product from said intermediate station in said path and applying it to the agricultural product at a beginning station near the beginning of said path;
    draining fluid that has passed through said agricultural product from the beginning station and retaining it as the extracted juice;
    drying the agricultural product after it has passed through said one station and retaining it as the solid residue; and
    defecating the fluid after it has been drained from the intermediate station along said path and before it has been applied to the agricultural product at the beginning of the path.

2. The method of claim 1 in which an additive is applied to the agricultural product to bring its pH to a value between 7 and 7.5.

3. The method of claim 1 in which the step of defecating the fluid includes the step of bringing pH of the fluid to between 6.5 and 7.5.

4. The method of claim 3 in which the step of defecating the fluid further includes the step of:
    creating a first vortex in the fluid;
    adding calcium hydroxide to the first vortex;
    creating a second vortex in the fluid at a location through which the fluid flows after passing through the first vortex; and
    adding phosphoric acid to the second vortex.

5. The method of claim 1 in which the step of feeding said agricultural product along a path includes the step of feeding the agricultural product along a path that is substantially horizontal, in which the step of draining the fluid from the intermediate station includes the step of draining the fluid from the bottom of the horizontal path at the intermediate station; and in which the step of applying the fluid to the agricultural product at the beginning station includes the step of pumping the fluid from the intermediate station to the top of the beginning station and pouring it over the top of the agricultural product.

6. The method of claim 5 in which the step of draining the fluid that has passed through the agricultural product from the beginning station and retaining it as the extracted juice includes the step of filtering the fluid through a screen after it is removed from the beginning station.

7. The method of claim 5 in which the step of drying the agricultural product after it has passed through said one station includes the step of continuously passing said agricultural product through squeeze rollers.

8. Apparatus for separating the ingredients of an agricultural product, comprising:
    a plurality of diffuser stations;
    conveyor means for transporting said agricultural product through said plurality of diffuser stations in a first direction;
    said plurality of diffuser stations including a beginning station to which said agricultural product is conveyod first by said conveyor means, an intermediate station to which said agricultural product is conveyed after it has been conveyed through said beginning station by said conveyor means, and an end station to which said agricultural product is applied after said intermediate station;
    means for applying fluid to the agricultural product in said diffuser stations;
    means for collecting said fluid after it has passed through said agricultural product at said end station;
    means for supplying said collected fluid from said end station to the agricultural product at said intermediate station;
    means for collecting fluid after it has passed through the agricultural product at said intermediate station and supplying it to the agricultural product at said beginning station;
    means for removing the fluid from said beginning station, which fluid includes juice extracted from said agricultural product; and means for defecating said fluid collected from said intermediate station before it is passed to said beginning station, whereby impurities are removed from said fluid.

9. Apparatus according to claim 8 in which said means for defecating said fluid includes a means for introducing calcium hydroxide and phosphoric acid into said fluid.

10. Apparatus according to claim 8 further including means for drying said agricultural product after it has passed through said end station.

11. Apparatus according to claim 10 in which said means for drying said agricultural product includes squeeze rollers for continuously squeezing said agricultural product and means for supplying liquid extracted by squeezing said agricultural product at one of said stations.

12. Apparatus according to claim 11 in which said means for defecating said agricultural product includes:
means for causing said fluid to flow upwardly in a first direction;
means for creating a first vortex in said fluid as it flows upwardly;
means for introducing a caustic solution into said vortex;
means for creating a second vortex in said fluid as it flows upwardly;
means for neutralizing said fluid by applying an acid into said second vortex.

13. Apparatus according to claim 12 further including a plurality of additional interconnected diffuser stations between said beginning station and said end station.

14. Apparatus according to claim 13 in which said product is a sugar bearing product.

15. Apparatus according to claim 14 in which said conveyor means includes a conveyor and each of the diffuser stations along said conveyor include a trough for collecting fluid underneath the conveyor, a weir for pouring fluid onto the agricultural product in the station, a pump and conduits interconnecting the collection trough of each station except the beginning station, to the weir of the preceding station to transport fluid from the collection troughs to the weirs.

16. Apparatus according to claim 15 in which said agricultural product is corn and said juice is sucrose or sugar.

17. Apparatus according to claim 15 further including a means for maintaining the liquid in said stations at a temperature within the range of 120° Fahrenheit to 140° Fahrenheit.

18. Apparatus according to claim 17 in which said means for maintaining the liquid in said stations at a temperature within the range of 120° Fahrenheit to 140° Fahrenheit include a source of steam.

References Cited
UNITED STATES PATENTS

| | | | |
|---|---|---|---|
| 1,095,189 | 5/1914 | Carniol | 127—44 |
| 3,113,027 | 12/1963 | Learner et al. | 23—270X |
| 3,275,472 | 9/1966 | Tantawi et al. | 127—5 |
| 3,313,653 | 4/1967 | Jung | 127—4X |
| 3,323,948 | 6/1967 | Silver et al. | 127—44 |
| 3,443,549 | 5/1969 | Dambrine | 127—3X |

JOSEPH SCOVRONEK, Primary Examiner

D. G. CONLIN, Assistant Examiner

U.S. Cl. X.R.

23—270; 127—3, 43, 45, 46